No. 710,178. Patented Sept. 30, 1902.
C. BODMER.
BEVEL.
(Application filed Sept. 6, 1901.)
(No Model.)
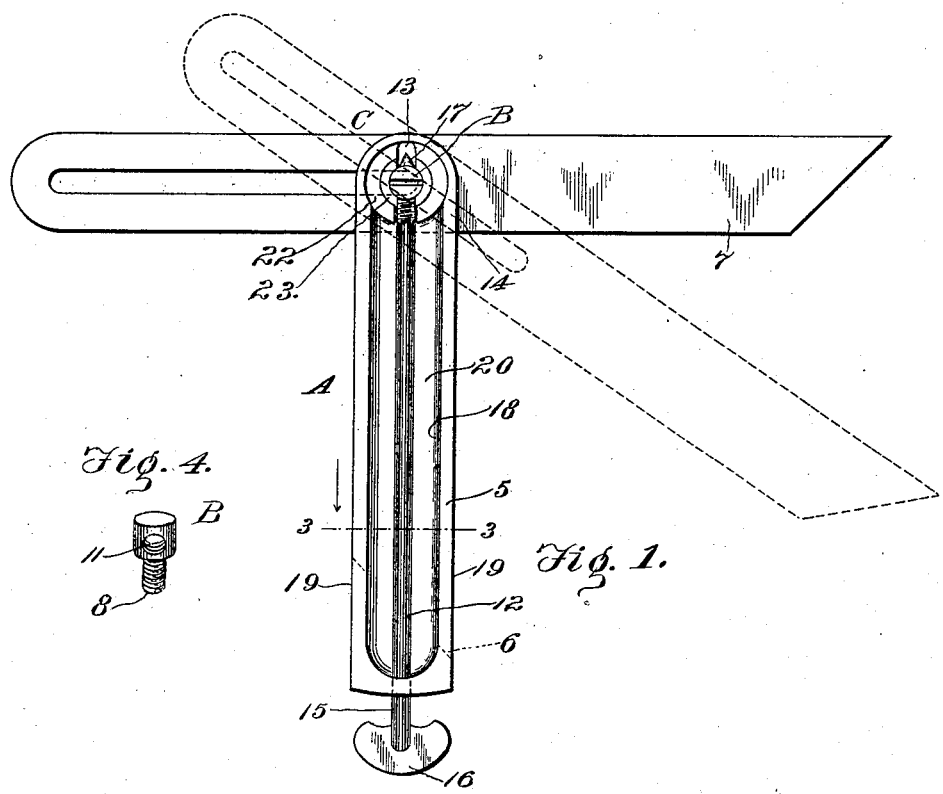
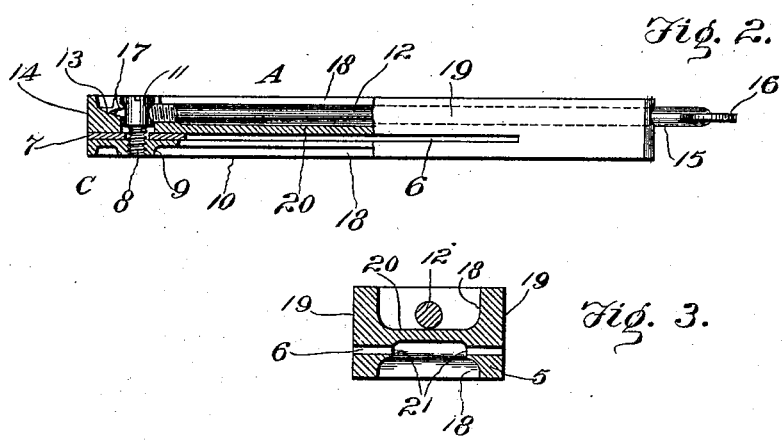
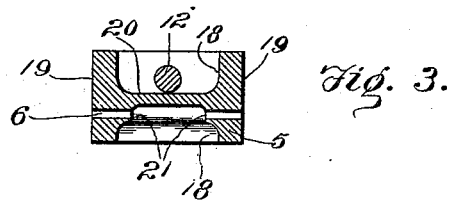
Witnesses:
Fred E. Maynard
R. W. Pittman
Inventor,
Christian Bodmer.
By his Attorney,
F. H. Richards.
THE NORRIS PETERS CO., PHOTO-LITHO., WASHINGTON, D. C.

UNITED STATES PATENT OFFICE.

CHRISTIAN BODMER, OF NEW BRITAIN, CONNECTICUT, ASSIGNOR OF ONE-HALF TO JUSTUS A. TRAUT, OF NEW BRITAIN, CONNECTICUT.

BEVEL.

SPECIFICATION forming part of Letters Patent No. 710,178, dated September 30, 1902.

Application filed September 6, 1901. Serial No. 74,496. (No model.)

*To all whom it may concern:*

Be it known that I, CHRISTIAN BODMER, a citizen of the United States, residing in New Britain, in the county of Hartford and State of Connecticut, have invented certain new and useful Improvements in Bevels, of which the following is a specification.

This invention relates to bevels, and has for its object to provide a bevel with an adjustable blade which may be effectively clamped in its adjusted position.

A further object of the invention is to provide a bevel wherein there are but few parts employed.

A further object of the invention is to provide a bevel having a stock made of a single piece, which, if desired, may be of metal.

A further object of the invention is to provide a single-piece metal stock having a kerf for the reception of the blade and wherein the stock is reduced in thickness in the center for the reduction of weight and saving of material and a stock wherein the internal edges of said reduced portion are so disposed that in cross-section such edges are substantially transverse to the kerf.

In carrying out my invention I employ a bifurcated stock, which may, if desired, be made of a single piece of metal to which the usual or any desired form of adjustable blade may be pivoted. If the stock is made of one piece, it will have a kerf running from one end substantially to the other, and for the purpose of lightness and the saving of material the stock may be hollowed out on each side in such a manner that it will not interfere with the straight edges or working faces of the stock. By such hollowing out less material will be in the path of the saw in making the kerf, and to present a neater appearance of the finished stock and also to prevent the tendency of the saw to deviate from its path the inside edges of the hollowed-out portion may be made, if desired, with the portion where the saw is to cut substantially transverse to the line of cut. For the purpose of clamping the blade in its adjusted position a pivot or adjustable connection is employed engaging one side of the bifurcated stock and passing through the opening in the blade and on through the other side of the stock and there adapted to be traversed by some instrumentality preferably entering from the end of the stock farthest from such pivot or connection and engaging a portion of the stock, which may, if desired, be made beveled beyond such pivot, whereby the pivot may be drawn up tightly, clamping the sides of the bifurcated stock against the blade to hold it in its adjusted position. If desired, the engagement between the pivot or connection and the first-mentioned side of the stock may be screw-threaded, and the portion of the pivot traversed by the clamping device may be screw-threaded and corresponding screw-threads be provided upon such device, which may be tapered or beveled to correspond with the bevel of the stock, so that by turning such instrumentality the screw-threads will cause the same to traverse the pivot and ride up on the beveled surface provided upon the stock, and such screw-threads will maintain such instrumentality on the beveled surface. The screw-threads, if screw-threads are used for holding the pivot in engagement with one of the sides of the stock, may be utilized for changing the position of the pivot to cause the end of the instrumentality which traverses it to impinge with greater or less degree of force upon the portion of the stock with which it is adapted to engage. In cutting the kerf it may end on a bevel to correspond with whatever bevel there may be on the end of the blade, so that such blade may lie securely and neatly against the sides. By this construction it is possible to employ but few parts, all of which are or may be so positioned as to be clearly visible. Although it is above-mentioned that the stock may be made of metal, any suitable material may be employed.

In the drawings accompanying and forming part of this specification, Figure 1 is a plan view of one form of bevel embodying my invention. Fig. 2 is a side view of the same, part of it being broken away and part a central longitudinal section. Fig. 3 is a cross-section on the line 3 3, Fig. 1, looking in the direction of the arrow; and Fig. 4 is a perspective view representing one form of pivot or adjustable connection employed for clamping the blade in position.

Similar characters of reference designate corresponding parts in the various figures of the drawings.

The bevel-stock (designated in a general way by A) and which in the present instance is shown as a single piece of material 5 is provided with a kerf 6 and a blade 7, mounted therein on a suitable pivot or adjustable connection, (designated in a general way by B,) which pivot may be caused to clamp the stock and blade together by some suitable means, (designated in a general way by C,) and which pivot in the present instance comprises, preferably, a screw 8, which enters a tapped boss or threaded opening 9 in one of the sides 10 of the bifurcated stock, and which pivot or adjustable connection has an enlarged head having a hole 11, through which the means employed for coöperating with the pivot, such means being shown herein preferably as a rod 12 passing through said hole 11 and after traversing said pivot engaging a portion 13 of the side 14 of the bifurcated stock, which portion 13 may, if desired, be beveled. The rod may be continued at 15 past the end of the stock opposite from such pivot and there be provided with a winged head 16 for manual operation, it being noted that a bearing for the rod is formed in such remote end of the stock, thus strengthening the structure and preserving effective coöperative relationship between the parts or elements. The operative end of the rod 12 may, if desired, be screw-threaded and corresponding screw-threads be provided upon the inside of the hole 11 in the pivot. The said operative end of the rod may be beveled or conical, as at 17, for engagement with the side of the stock, and the sides of the stock may be cut away, as at 18 18, leaving straight working faces 19 19 and a thin central web 20. If the stock be made of metal, such a construction will not only have a tendency to make the instrument lighter and save material and provide a housing or recess for the operating-rod, but will also make the manufacture of the instrument easier, there being less material for the saw to pass through in producing the kerf. If desired, the material of the stock may be made substantially transverse to the line of the saw, as at 21 21, by which means a more finished edge will be left after the passage of the saw and less strain will be produced upon the saw with which it is cut. The side 14 may be provided with a circular portion 22, having a boss 23, through which is an opening corresponding to the general outline of the portion of the pivot which is adapted to pass through it, through which portion 22 a channel may be machined for permitting the rod to enter and traverse the pivot and for providing a suitable bearing-face for the end of said rod, and in the present instance the portion of said boss remaining constitutes segments of a circle, between the innermost ends of which the operative portion of the rod is partly nested, as shown. In the present instance the blade is shown as having a beveled end and the kerf where it ends as also being beveled to correspond thereto.

It will be readily seen that in operation the blade may be set at any desired angle to suit the bevel it is desired to employ it upon, and by turning the rod it will be screwed through the pivot or adjustable connection and ride up on the portion of the stock provided for such purpose, whereupon the bifurcated sides of the stock will be drawn tightly against the blade and hold the same in its adjusted position. If it is desired to either tighten or loosen the adjusting device, the rod may be unscrewed from the pivot and the pivot screwed up or down, as the exigencies of the case may demand. Upon the reëntry of the rod within the pivot the end thereof where it engages the stock will be caused to bear against the same with a different degree of force than was theretofore exerted. As will also be observed, the head of the pivot or adjustable connection B works snugly in the unthreaded bore or opening therefor in the stock, and consequently all lateral strains to which said pivot or connection may be subjected (either from manipulation of the operating-rod or otherwise) will be received between said head and the sides of the opening, and thus will such strains be taken from the engaging portion of the pivot itself, with less liability to loosening of the latter due to wear either of its own threads or the threads in the opening in the stock in which it is seated. The present embodiment of bevel also has further advantages due to the special construction and organization of the elements thereof, as is apparent. Thus the operative portion of the adjusting-rod 12 has a threaded seat in the head of the adjustable connecting-pivot, and the conical or pointed end of said rod extends through such head and bears upon the outwardly-beveled face of the stock, and the organization of these parts is such, especially by reason of the slight freedom with which they are generally fitted in the manufacture of the instrument, that the forces or strains to which the parts are subjected when the blade is clamped in position for use cause the several parts to adjust themselves one to the other in a very practicable and effective manner and with a minimum of play, while at the same time securing a firm clamping of the blade. The lateral pressure upon the threaded portion of the adjusting-rod comes entirely within the head of the said connecting-pivot, and the stock itself is not threaded for receiving such threaded portion of said rod. The enlarged head of said pivot 11 is fitted closely but freely within the bore or opening therefor in the body of the stock, and thus the lateral strain due to the operation of the adjusting-rod and the bearing of the beveled or conical portion thereof against the beveled face of the stock is prevented from throwing the pivot out of alinement.

Another important feature of my present improvements is that of the construction of the bevel-stock, this being cast (usually made of an iron casting) with the aforesaid relatively thin and substantially continuous web 20 of metal integral with the other portions of the stock and located at one side of the plane in which the kerf 6 is formed or cut to receive the blade. By means of this continuous web the side portions (on which are the working faces 19 19) of the bevel-stock are maintained rigidly in place relatively to each other throughout their entire length, thus preventing distortion of the stock by pressure thereon and also preventing the springing of the said side portions out of alinement at their working faces and which is apt to occur in practice where a slot or opening extends through any considerable portion of the length of the stock or in any case of such a web having a slot in it. The particular location of said web 20 permits the sawing of the kerf into the body of the stock without requiring the saw-cut to extend through the entire depth or thickness of the stock, and at the same time the cast metal of which said web is made does not need to have any portion thereof cut away in forming the kerf, and thus the web remains in the finished bevel in the form and condition it had in the casting as originally made, preserving the peculiar rigidity and strength thereof due to the unbroken "skin" of metal formed on all such castings in the process of making in the foundry.

Having described my invention, I claim—

1. In a bevel, the combination of a stock kerfed for a distance and provided at one end with a pivot-seat; a pivot occupying said seat; an adjustable blade located in said kerf and on said pivot; and means entering said stock at the end opposite said pivot-seat, traversing said pivot and engaging the stock beyond the pivot-seat and effective to thereby clamp said blade in its adjusted position relatively to the stock.

2. In a bevel, the combination of a stock; an adjustable blade carried thereby; a pivot for said blade carred by said stock; and means passing through said pivot and engaging said stock beyond the pivot and effective to clamp the stock and the blade in their adjusted positions relatively to each other.

3. In a bevel, the combination of a bifurcated stock; a pivot provided with a screw-threaded hole in adjustable engagement with one side of said bifurcated stock and freely traversing the other side thereof; an adjustable blade mounted on said pivot; and screw-threaded means traversing said hole in said pivot and engaging one side of said stock beyond said pivot and effective to clamp said sides upon the blade.

4. In a bevel, the combination of a stock kerfed for a distance, and at one end having one of its sides provided with a tapped boss constituting a pivot-seat, and the other of said sides provided with a plain pivot-seat; a pivot having a tapped opening provided with a screw adapted to enter said tapped boss, and with a plain portion adapted to traverse said plain pivot-seat; clamping means entering said stock at its end opposite said pivot and having a screw-threaded portion traversing the hole in said pivot and projecting therebeyond and engaging a face upon said stock.

5. In a bevel, the combination of a stock kerfed for a distance, and at one end having one of its sides provided with a tapped boss constituting a pivot-seat, and the other of said sides provided with a plain pivot-seat; a pivot having a tapped opening provided with a screw adapted to enter said tapped boss, and with a plain portion adapted to traverse said plain pivot-seat; a beveled face upon the side of the stock; a clamping-rod entering said stock at its end opposite said pivot and having a screw-threaded portion traversing the hole in said pivot and projecting therebeyond and engaging the beveled face upon said stock.

6. In a bevel, the combination of a stock kerfed for a distance, and at one end having one of its sides provided with a tapped boss constituting a pivot-seat, and the other of said sides provided with a plain pivot-seat; a pivot having a tapped opening provided with a screw adapted to enter said tapped pivot-seat; a clamping-rod entering said stock at its end opposite said pivot and having a screw-threaded portion traversing the hole in said pivot and projecting therebeyond, and having a conical end, and engaging a face upon said stock.

7. In a bevel, the combination of a stock kerfed for a distance, and at one end having one of its sides provided with a tapped boss constituting a pivot-seat, and the other of said sides provided with a plain pivot-seat; a pivot having a tapped hole provided with a screw adapted to enter said tapped boss, and with a plain portion adapted to traverse said plain pivot-seat; a beveled face upon the side of the stock; a clamping-rod entering said stock at its end opposite said pivot and having a screw-threaded portion traversing the hole in said pivot and projecting therebeyond, and having a conical end, and engaging the beveled face upon said stock.

8. In a bevel, the combination of a stock made from a single piece and having straight working faces and reduced central portions; a central web; a kerf cut through said working faces in a plane parallel to the plane of said web, the internal edges of the stock at such kerf being substantially transverse thereto; a tapped boss in one side of said stock comprising a pivot-seat and a plain pivot-seat in the other side of said stock; a pivot provided with a tapped hole, and having screw-threaded engagement with said tapped boss and adapted to traverse said plain pivot-seat, a beveled engaging face in line with the hole of the pivot; and a rod entering said stock from the end opposite the pivot end thereof and passing through said pivot, and having a conical end projecting therethrough, and effective to slide up on said beveled face and clamp the sides of the stock upon the blade.

9. A bevel comprising a stock constructed with a longitudinal recess and having a kerf and a blade adjustable therein, said stock being formed on one side of the kerf with a threaded bore or opening and on the other side thereof with a smooth bore, a connection engaging said threaded bore and working in said smooth bore, and means operatively engaging said connection and coöperating with a portion of the stock to clamp the blade in position, said means being nested in said recess and having a bearing in the end of the stock most remote from said bores.

10. A bevel comprising a stock having a kerf and a blade adjustable therein, said stock being formed on one side of the kerf with a threaded bore, and on the other side thereof with a smooth bore, and having an inclined surface beyond such bores, a threaded screw adjustably engaging said threaded bore, and having enlarged head formed with a threaded transverse opening, said head working freely in the smooth bore, and an operating-rod having a threaded portion working in the opening in the pivot-head and formed with a conical portion coöperating with said inclined surface to clamp the blade in position.

11. A bevel comprising a stock having a recess in its outer surface substantially the full length thereof, and formed with a kerf and an adjustable blade therein, said stock having a threaded bore on one side of the kerf and a smooth bore on the other, and provided with an inclined surface beyond such bores, a threaded pivot adjustably engaging the threaded bore and having an enlarged head working freely in the smooth bore and provided with a threaded transverse opening, and an operating-rod having a threaded portion working in the opening in the pivot-head and made conical at the end to engage said inclined surface, said rod being housed in the recess of the stock below the general or working surface of the latter.

12. A bevel comprising a stock having a recess in its outer surface substantially the full length thereof, an adjustable blade on the stock, and means securing the blade in different positions including an operating-rod housed within said recess below the general or working surface of the stock.

13. A bevel comprising a stock having a recess in its outer surface substantially the full length thereof, an adjustable blade on the stock, and means securing the blade in different positions including an inclined surface, a rivet having an enlarged head provided with a transverse hole, and an operating-rod having a conical or beveled end passing through the rivet-hole and engaging said inclined surface, said rod being housed within the recess of the stock below the general or working surface of the latter.

14. A bevel comprising a stock formed with side flanges or working faces and an integral substantially continuous and relatively thin connecting-web, said stock being also formed with a kerf for a blade cut in the said side flanges in a plane outside of and adjacent to and parallel with the surface of said connecting-web.

CHRISTIAN BODMER.

Witnesses:
STANLEY PARKER,
GEO. E. PRENTICE.